United States Patent [19]

Powers et al.

[11] 3,976,554

[45] Aug. 24, 1976

[54] METHOD OF FORMING BETA-ALUMINA ARTICLES

[75] Inventors: Robert W. Powers, Schenectady; Stephan P. Mitoff, Elnora; Edward Szymalak, Schenectady, all of N.Y.

[73] Assignee: General Electric Company, Schenectady, N.Y.

[22] Filed: Dec. 31, 1975

[21] Appl. No.: 645,549

[52] U.S. Cl. ............................................. 204/181
[51] Int. Cl.² ...................... C25D 1/14; C25D 1/20
[58] Field of Search ..................................... 204/181

[56] References Cited
UNITED STATES PATENTS 3,896,018 7/1975 Powers et al. .................... 204/181
3,900,381 8/1975 Powers .............................. 204/181

*Primary Examiner*—Howard S. Williams
*Attorney, Agent, or Firm*—Paul R. Webb, II; Joseph T. Cohen; Jerome C. Squillaro

[57] ABSTRACT

A method of forming a beta-alumina article includes electrophoretically depositing such material on a mandrel, exposing the deposited material promptly to a continuous flow of warm air thereby drying the deposited material, and sintering the dried material. Alternately, the deposited material is stored in a chamber purged continuously with an inert gas until the material is dried in a flow of warm dry air. Such articles are useful as solid electrolytes in sodium-sulfur and sodium halogen batteries.

4 Claims, No Drawings

METHOD OF FORMING BETA-ALUMINA ARTICLES

The present invention relates generally to a method of forming ionically conductive ceramics and is more concerned with an improved method of forming beta-alumina articles having good electrical and structural characteristics.

Beta-alumina articles are useful as solid electrolytes in electrical energy storage devices in a variety of combinations of electrode materials useful over a broad range of operating temperature conditions. For example, a high-energy battery employs an anode of sodium and a cathode of sulfur in which both the sodium and sulfur are in the molten state at operating temperature and are in contact with and separated by an electrolyte of a thin, plate-like article or of a closed end tube of sodium beta-alumina. A high-energy battery can also employ in a similar structure an anode of the sodium type and a halogen cathode separated by the same type of sodium beta-alumina electrolyte. Kummer et al. U.S. Pat. No. 3,404,036 describes the use of a plate-like article of sodium beta-alumina as the solid electrolyte in an energy conversion device. A closed end tube or casing of sodium beta-alumina as the solid electrolyte in a sodium-halogen battery is described in U.S. Pat. No. 3,762,955 issued Oct. 2, 1973, for "Sealed Primary Sodium-Halogen Battery." This patent is assigned to the same assignee as the present application.

In French Patent Addition No. 95,549, which was published on Jan. 22, 1972, there is a discussion of the principal Pat. No. 1,597,279 of Dec. 27, 1968. Both the principal patent and patent of addition deal with an improved procedure for making thin specimens of sinterable material, in particular ceramic material such as zirconia. Such specimens can be used as solid electrolytes in fuel cells operating at high temperature. It is understood that beta-alumina can be formed in accordance with the above French patent addition.

In U.S. Pat. Nos. 3,896,018; 3,896,019 and 3,900,381 there are described and claimed methods of making beta-alumina articles. U.S. Pat. No. 3,881,661 includes an improved milling method. These patents and the subject matter thereof are hereby incorporated by reference. Copending patent application Ser. No. 581,807 filed May 29, 1975 describes and claims a method of preparing a suspension of additive-free beta-alumina particles which are useful to form additive-free beta-alumina articles. These patents, the above copending application Ser. No. 581,807 and the subject matter thereof are hereby incorporated by reference in the present application.

An article No. 11 entitled "Production of $\beta$-Al$_2$O$_3$ Electrolyte" appeared by Wynn Jones and L. J. Miles in Proceedings of the British Ceramic Society, No. 19, 1970, pages 161–178. Beta-alumina electrolyte has been prepared, according to the article, in the form of long thin tubes by isostatic pressure molding of a mixture of alpha-alumina and sodium aluminate followed by reaction sintering between 1600° and 1900°C in an inductively heated furnace thereby converting the material to beta-alumina. A five minute firing time is used by moving the pressed tube through a 2.5 inch hot zone at 0.5 inch per minute. On page 164 of this article, it is described that the alpha-alumina and sodium aluminate are dry milled by vibro-milling with alumina cylinders for periods of up to 48 hours to achieve grinding and homogenization. The particles were isostatically molded at pressure of 30,000 lb-f/in$^2$.

As opposed to applicant's invention, this article describes vibromilling alpha-alumina and sodium aluminate in the absence of a vehicle with alumina cylinders for periods up to 48 hours. The particles are then isostatically pressed and reaction sintered.

The primary object of our invention is to provide an improved method of forming beta-alumina articles for use as ionically conducting ceramic electrolytes thereby producing long operating life in sodium-sulfur cells.

In accordance with one aspect of our invention, a method of forming a beta-alumina article which includes exposing the electrophoretically deposited material promptly to a continuous flow of warm air thereby drying the material prior to sintering the dried material.

These and various other objects, features and advantages of the invention will be better understood from the following description.

We found an improved method of preparing a suspension of beta-alumina particles from water-free beta-alumina. As described in the above-referenced U.S. Pat. Nos. 3,896,018, 3,896,019, 3,900,381 and 3,881,661, zirconia is the preferred grinding media. Alpha-alumina is also mentioned as a grinding media. Zirconia grinding media is dense, mills fast and has low wear. Some zirconia is introduced during milling into the beta-alumina. Alpha-alumina is not as dense as zirconia and mills slower. Its major disadvantage is that alpha-alumina contaminates the beta-alumina particles by reducing seriously the soda content thereof resulting possibly in adverse effect on the electrical resistivity of the subsequently sintered beta-alumina article.

As it is pointed out in copending patent application Ser. No. 581,807, the employment of beta-alumina grinding media was not contaminating to the beta-alumina particles resulting in additive-free beta-alumina particles. The beta-alumina grinding media is not as dense as zirconia or alpha-alumina grinding media but it wears less during milling than alpha-alumina.

As it was further pointed out in copending patent application Ser. No. 581,807, the suspension of beta-alumina particles for the beta-alumina grinding media can be produced in accordance with U.S. Pat. Nos. 3,896,018, 3,896,019 or 3,881,661. The beta-alumina particles from the beta-alumina suspension can be formed into beta-alumina grinding media in accordance with U.S. Pat. No. 3,896,019. In application Ser. No. 581,807, a suspension was prepared containing 150 grams of water-free Alcoa XB-2 beta-alumina with particles of a diameter greater than 20 microns, the beta-alumina particles having been modified by the inclusion of one percent MgO, 0.188 gram aluminum stearate, and 300 cubic centimeters of n-amyl alcohol. The suspension was vibromilled for eighteen hours using 1800 grams of zirconia grinding cylinders. The above suspension, its preparation, milling and resulting suspension are described in detail in U.S. Pat. No. 3,896,018. After milling, the resulting powder was allowed to settle from the suspension. Supernatant liquid was decanted, and the powder was air dried. The cake was broken up and further dried in a vacuum oven at 220°C. The powder was then hydrostatically pressed into ⅝ in. diameter cylinders at 25,000 psi pressure. These cylinders were cut into slugs, about ⅝ in. in diameter by ⅝ in. in length. They were sintered at 1700°C at a traverse rate through the sintering furnace of 0.5 in. per minute. The cylinders were very fine grained and appeared to be uniformly sintered throughout. The fired density measured on two cylinders was 3.177 and 3.189 grams per cubic centimeter. A plurality of grinding cylinders was obtained in this manner.

A suspension was prepared containing 150 grams of water-free Alcoa XB-2 beta-alumina with an aggregate particle size greater than 2 microns, 0.188 gram aluminum stearate and 300 cubic centimeters of n-amyl alcohol. The suspension was vibromilled for six days using 900 grams of the above-described beta-alumina grinding media to break up the aggregates and the crystallites and to charge the particles. The resulting additive-free beta-alumina having a majority of particles with a size in the range of from 0.5 to 2 microns in the suspension after removal of the grinding media were electrophoretically deposited on a mandrel, the deposit was dried, and the deposit was removed as described in U.S. Pat. No. 3,896,018. The sintering of the deposit at a traverse rate through the furnace of 0.5 in. per minute was accomplished as described in U.S. Pat. No. 3,896,019. The resulting device was an additive-free beta-alumina article. The article had a density measured at 3.20 grams per cubic centimeter when fired at 1750°C.

When the water-free beta-alumina was milled with an aggregate particle size greater than 20 microns, such as about 40 microns, to a particle size wherein a majority of the particles have a size in the range of from 0.5 to 2 microns, at least six days of milling were required to provide the subsequently sintered beta-alumina particles with a fired density of 3.20 grams. The milling time was reduced by employing initially water-free beta-alumina particles with a median size greater than 2 microns, such as in the range of 3 to 5 microns, but substantially less than an aggregate particle size greater than 20 microns.

The additive-free particles produced from an initial aggregate particle size of about 40 microns were sintered successfully at 1750°C to provide a density of 3.20 grams per cubic centimeter after six days of milling. The aggregate particle size was reduced during milling wherein a majority of the resulting particles had a size in the range of 0.5 to 2 microns. When such aggregate particles were milled for four days, the density was substantially below the desired 3.20 grams per cubic centimeter. When the milling was increased to eight days with the same size initial aggregate particles, the desired density was obtained upon sintering at a lower temperature of 1725°C. When the milling was increased further to a maximum of 10 days, the desired density of 3.20 grams per cubic centimeter was exceeded and successful sintering was obtained at 1725°C. Thus, with initial aggregate particle size of a diameter greater than 20 microns, at least six days of milling is required. However, with initial particles with a median size greater than 2 microns but substantially less than an aggregate size of 20 microns, the milling time was reduced to one day of milling with a subsequent density of 3.22 grams per centimeter when sintered as above described at 1750°C. The method of copending patent application Ser. No. 581,807 resulted in providing a suspension of additive-free beta-alumina particles.

The generally deleterious effect of moisture in affecting the charge on beta-alumina particles was described in the patents cited above as well as in an article in J. Electrochemical Society, 122, 490–500 (1975). However, this invention is concerned with a different effect of humidity and with means for controlling the same to improve the processing of beta-alumina articles.

We found that removal of green tubes from the mandrel could be accomplished more easily and cracking during removal could be overcome by limiting exposure to atmospheric humidity of both the n-amyl alcohol suspensions of beta-alumina particles from which electrophoretic deposition is carried out as well as of green tubes after forming. We found that such tube removal from mandrels was accomplished by drying tubes in a continuous flow of warm air, such as warm discharge from a dehumidifier. Previously, tubes were dried by aid of the hood draught as described in the above assigned patents. However, this substantial improvement occurred only for those tubes deposited within about an hour of the onset of drying with a continuous flow of warm air. On the other hand, those tubes left exposed to the ambient atmosphere for several hours before drying were still difficult to remove from the mandrels.

We solved the second problem by the use of a holding chamber, continually purged with dry nitrogen or other dry inert gas, in which deposited tubes were stored prior to drying. The combined use of such a holding chamber and the continuous flow of warm air as from a dehumidifier now permitted the easy removal of the beta-alumina tubes from mandrels.

Examples of methods of forming beta-alumina articles and articles made thereby in accordance with the methods of our invention are as follows:

EXAMPLES I – V

Five suspensions were prepared which are identified as Examples I – V. Each suspension contained 150 grams of water-free Alcoa XB-2 beta-alumina with an aggregate particle size of about 40 microns, 0.150 gram aluminum stearate and 300 cubic centimeters of n-amyl alcohol. Each suspension employed 1800 grams of zirconia grinding media. Each suspension was vibromilled for 24 hours. The resulting beta-alumina particles in each suspension after removal of the grinding media were electrophoretically deposited on mandrels to provide five deposits and subsequently five articles. The resulting particles had a majority of the particles with a size in the range from 0.5 to 2 microns. Each deposit was dried and the deposit was removed by hand as will be described below. The subsequent sintering of the various deposits at a traverse rate through the preheated oxygen oxidizing atmosphere furnace at 0.5 in. per minute was accomplished at a temperature of 1675°C as described in U.S. Pat. No. 3,896,019. Each resulting device was a beta-alumina article.

EXAMPLE VI

The five articles produced from each suspension are set forth below in Table 1 and are identified as I — 1, 2, 3, 4 and 5; II — 1, 2, 3, 4 and 5; III — 1, 2, 3, 4 and 5; IV — 1, 2, 3, 4 and 5; and V — 1, 2, 3, 4 and 5. These article identifications correspond to the five suspensions Examples I – V, and subsequent deposits and articles from these suspensions.

TABLE 1

| Article No. | Drying (1) Conditions | Ease of (2) Removal | Tendency to Crack after Sintering |
|---|---|---|---|
| I-1 | CD | no effort | OK |
| -2 | AD | quite difficult | cracked |
| -3 | CD | no effort | OK |
| -4 | AD | very difficult | cracked |
| -5 | CD | no effort | OK |
| II-1 | AD | very difficult | cracked |
| -2 | CD | no effort | OK |
| -3 | AD | very difficult | cracked |
| -4 | CD | no effort | OK |
| -5 | AD | very difficult | cracked |
| III-1 | CD | no effort | OK |
| -2 | AD | very difficult | slight crack on top |
| -3 | CD | no effort | OK |
| -4 | AD | broke on removal | — |
| -5 | CD | no effort | OK |
| IV-1 | AD | very difficult | OK |
| -2 | CD | no effort | OK |
| -3 | AD | very difficult | OK |
| -4 | CD | no effort | OK |
| -5 | AD | slightly difficult | OK |
| V-1 | CD | no effort | OK |
| -2 | AD | no effort(3) | broke after density meas. |
| -3 | CD | no effort | OK |
| -4 | AD | no effort(3) | OK |
| -5 | CD | no effort | OK |

(1) CD indicates tube kept in dry nitrogen chamber until dried by dehumidifier discharge while AD indicates tube exposed to atmosphere until dried with dehumidifier.
(2) No effort means tubes readily pushed off mandrel by hand. Otherwise, degree of difficulty indicated in pulling tube off mandrel using other arrangements.
(3) These tubes were the last deposited and were exposed to the atmosphere for only a short time.

While other modifications of the invention and variations thereof which may be employed within the scope of the invention have not been described, the invention is intended to include such as may be embraced within the following claims:

What we claim as new and desire to secure by Letters Patent of the United States is:

1. A method of forming a beta-alumina article which comprises providing a suspension consisting of beta-alumina particles the majority of which have a size in the range of from 0.5 to 2 microns in an organic fluid having a dielectric constant at 25°C of from 12 to 24, electrophoretically depositing the beta-alumina particles from the suspension as a dense deposit onto a charged electrode in a DC electric field of from 100 to 10,000 volts per centimeter, drying the deposit on the mandrel in a continuous flow of warm air, removing the deposit from the electrode, and sintering the deposit in an oxygen oxidizing atmosphere at a temperature between 1575° and 1825°C resulting in a dense, sintered beta-alumina article.

2. A method of forming a beta-alumina article as in claim 1, in which the continuous flow of warm air is provided by a dehumidifier.

3. A method of forming a beta-alumina article which comprises providing a suspension consisting of beta-alumina particles the majority of which have a size in the range of from 0.5 to 2 microns in an organic fluid having a dielectric constant at 25°C of from 12 to 24, electrophoretically depositing the beta-alumina particles from the suspension as a dense deposit onto a charged electrode in a DC electric field of from 100 to 10,000 volts per centimeter, placing the deposit on the mandrel within an inert gas atmosphere, removing subsequently the deposit on the mandrel from the inert gas atmosphere, drying the deposit on the mandrel in a continuous flow of warm air, removing the deposit from the electrode, and sintering the deposit in an oxygen oxidizing atmosphere at a temperature between 1575° and 1825°C resulting in a dense, sintered beta-alumina article.

4. A method of forming a beta-alumina article as in claim 3, in which the continuous flow of warm air is provided by a dehumidifier.

* * * * *